United States Patent
Gupta (10) Patent No.: US 8,751,997 B1
(45) Date of Patent: Jun. 10, 2014

(54) PROCESSING A FAST SPEED GRADE CIRCUIT DESIGN FOR USE ON A SLOWER SPEED GRADE INTEGRATED CIRCUIT

(71) Applicant: Xilinx, Inc., San Jose, CA (US)

(72) Inventor: Amit Gupta, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/804,774

(22) Filed: Mar. 14, 2013

(51) Int. Cl.
*G06F 17/50* (2006.01)

(52) U.S. Cl.
USPC ............ 716/134; 716/113; 716/126; 716/128

(58) Field of Classification Search
USPC .................................. 716/113, 126, 128, 134
See application file for complete search history.

(56) References Cited

U.S. PATENT DOCUMENTS

| | | | | |
|---|---|---|---|---|
| 5,452,239 | A * | 9/1995 | Dai et al. | 703/19 |
| 5,648,913 | A * | 7/1997 | Bennett et al. | 716/113 |
| 5,946,478 | A * | 8/1999 | Lawman | 716/117 |
| 6,278,289 | B1 * | 8/2001 | Guccione et al. | 326/40 |
| 6,526,557 | B1 * | 2/2003 | Young et al. | 326/38 |
| 6,668,237 | B1 * | 12/2003 | Guccione et al. | 702/119 |
| 6,725,441 | B1 * | 4/2004 | Keller et al. | 716/117 |
| 6,857,110 | B1 * | 2/2005 | Rupp et al. | 716/136 |
| 6,978,435 | B2 * | 12/2005 | Anderson et al. | 716/117 |
| 7,013,232 | B2 * | 3/2006 | Fuller, III et al. | 702/123 |
| 7,158,899 | B2 * | 1/2007 | Sunter et al. | 702/69 |
| 7,159,204 | B2 * | 1/2007 | Iotov et al. | 716/104 |
| 7,337,100 | B1 * | 2/2008 | Hutton et al. | 703/13 |
| 7,877,721 | B2 * | 1/2011 | Schleicher et al. | 716/117 |
| 8,108,855 | B2 * | 1/2012 | Dias et al. | 717/177 |
| 8,250,503 | B2 * | 8/2012 | Vorbach et al. | 716/104 |
| 8,286,113 | B1 * | 10/2012 | Bridgford et al. | 716/117 |
| 8,347,243 | B2 * | 1/2013 | Bruneel | 716/104 |
| 8,352,898 | B1 * | 1/2013 | Kellermann | 716/117 |
| 8,504,967 | B2 * | 8/2013 | Suzuki et al. | 716/120 |
| 2002/0072893 | A1 * | 6/2002 | Wilson | 703/26 |
| 2003/0033374 | A1 * | 2/2003 | Horn et al. | 709/217 |
| 2003/0121010 | A1 * | 6/2003 | Aubury | 716/4 |
| 2008/0163194 | A1 * | 7/2008 | Dias et al. | 717/174 |
| 2008/0244491 | A1 * | 10/2008 | Ganesan et al. | 716/10 |
| 2009/0060197 | A1 * | 3/2009 | Taylor et al. | 380/277 |
| 2012/0102448 | A1 * | 4/2012 | Haugestuen et al. | 716/134 |

* cited by examiner

*Primary Examiner* — Naum Levin
(74) *Attorney, Agent, or Firm* — Kevin T. Cuenot; Lois D. Cartier (57) ABSTRACT

Up-binning a circuit design includes receiving a first bitstream specifying the circuit design. The circuit design meets a timing requirement for a first speed grade of a programmable integrated circuit. Using a processor, a first parameter of the first bitstream is determined. The first parameter is applied to a hardware netlist of the programmable integrated circuit resulting in a parameterized hardware netlist specifying the circuit design. A timing analysis is performed upon the parameterized hardware netlist. The process further includes determining, from the timing analysis, whether at least a portion of the parameterized hardware netlist meets the timing requirement when using timing data for a second speed grade of the programmable integrated circuit. The second speed grade is slower than the first speed grade.

20 Claims, 4 Drawing Sheets

PROCESSING A FAST SPEED GRADE CIRCUIT DESIGN FOR USE ON A SLOWER SPEED GRADE INTEGRATED CIRCUIT

TECHNICAL FIELD

This specification relates to integrated circuits and, more particularly, to processing a circuit design originally designed for implementation on a fast speed grade integrated circuit for implementation using a slower speed grade integrated circuit.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect circuitry and the programmable logic circuitry each is typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs also can be implemented in other ways, e.g., using fuse or antifuse technology. The phrase "programmable IC" can include, but is not limited to, these devices and further can encompass devices that are only partially programmable. For example, one type of programmable IC includes a combination of hard-coded transistor logic and a programmable switch fabric that programmably interconnects the hard-coded transistor logic. Another example is an application specific integrated circuit (ASIC) that includes at least some programmable circuitry.

The Computer-Aided Design (CAD) tools used by programmable IC customers rely upon heavily abstracted timing information for the particular type of programmable IC in which the user circuit design is to be implemented, e.g., the target programmable IC. The CAD tools must be able to properly operate upon circuit designs intended for the target programmable IC regardless of the speed grade of the target programmable IC. The CAD tools must also properly operate for any of the multitude of different circuit designs that can be created and implemented within the target programmable IC. For these reasons, the timing analysis of conventional CAD tools tends to be overly conservative. Overly conservative timing analysis ensures that any circuit design determined to meet timing requirements by the CAD tool will actually meet the timing requirements in practice when loaded into the actual target programmable IC.

SUMMARY

A method of up-binning a circuit design includes receiving a first bitstream specifying the circuit design, wherein the circuit design meets a timing requirement for a first speed grade of a programmable integrated circuit. The method also includes determining, using a processor, a first parameter of the first bitstream, applying the first parameter to a hardware netlist of the programmable integrated circuit resulting in a parameterized hardware netlist specifying the circuit design, and performing a timing analysis upon the parameterized hardware netlist. The method further includes determining, from the timing analysis, whether at least a portion of the parameterized hardware netlist meets the timing requirement when using timing data for a second speed grade of the programmable integrated circuit. The second speed grade is slower, e.g., for a slower integrated circuit, than the first speed grade for which the circuit was compiled.

A system for up-binning a circuit design includes a processor programmed to initiate executable operations. The executable operations include receiving a first bitstream specifying the circuit design, wherein the circuit design meets a timing requirement for a first speed grade of a programmable integrated circuit. The executable operations also include determining a first parameter of the first bitstream, applying the first parameter to a hardware netlist of the programmable integrated circuit resulting in a parameterized hardware netlist specifying the circuit design, and performing a timing analysis upon the parameterized hardware netlist. The executable operations further include determining, from the timing analysis, whether at least a portion of the parameterized hardware netlist meets the timing requirement when using timing data for a second speed grade of the programmable integrated circuit. The second speed grade is slower than the first speed grade.

A non-transitory computer-readable medium includes instructions stored thereon that, when executed by a processor, cause the processor to perform a method. The method includes receiving a first bitstream specifying the circuit design, wherein the circuit design meets a timing requirement for a first speed grade of a programmable integrated circuit. The method also includes determining a first parameter of the first bitstream, applying the first parameter to a hardware netlist of the programmable integrated circuit resulting in a parameterized hardware netlist specifying the circuit design, and performing a timing analysis upon the parameterized hardware netlist. The method further includes determining, from the timing analysis, whether at least a portion of the parameterized hardware netlist meets the timing requirement when using timing data for a second speed grade of the programmable integrated circuit. The second speed grade is slower than the first speed grade.

DETAILED DESCRIPTION

While the specification concludes with claims defining novel features, it is believed that the various features disclosed within this specification will be better understood from a consideration of the description in conjunction with the drawings. The process(es), machine(s), manufacture(s) and any variations thereof described within this specification are provided for purposes of illustration. Specific structural and functional details disclosed within this specification are not to be interpreted as limiting, but merely as a basis for the claims and as a representative basis for teaching one skilled in the art to variously employ the features described in virtually any appropriately detailed structure. Further, the terms and phrases used within this specification are not intended to be limiting, but rather to provide an understandable description of the features described.

In accordance with the inventive arrangements disclosed within this specification, a circuit design can be processed for implementation within an integrated circuit (IC) rated with a slower speed rating than the IC for which the circuit design was originally created and/or compiled. The term "up-binning" refers to a technique or practice in which a circuit design that meets one or more timing requirements for a first IC is evaluated and/or processed to meet the timing requirement(s) when implemented within a second IC. The first IC and the second IC are of the same type or model. The first IC, however, is rated at a faster speed grade than the second IC.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
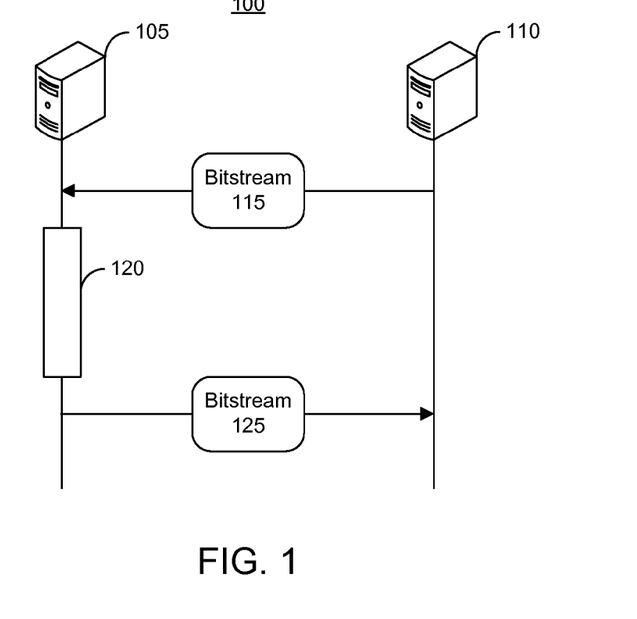
FIG. 1 is a block diagram illustrating an example of a communication system.

FIG. 1 is a block diagram illustrating an example of a communication system 100. As pictured, communication system 100 includes a computer system 105 and a computer system 110. For purposes of illustration, consider the case in which computer system 105 is owned, maintained, or used by an entity such as an IC manufacturer or an IC designer. In this regard, computer system 105 can be said to be associated with the entity. Computer 110 is associated with an entity that is creating a circuit design to be implemented within an IC designed and/or manufactured by the entity associate with computer system 105. For example, the entity associated with computer system 110 can be a customer or end-user for the entity associated with computer system 105.

Computer 105 and computer 110 are coupled through a network (not shown). The network can be implemented as, or include, any of a variety of different networks such as a wide area network (WAN), a local area network (LAN), a wireless network, a mobile network, a Virtual Private Network (VPN), the Internet, or the like.

Bitstream 115 specifies a circuit design that is to be implemented within an IC. For example, bitstream 115 is to be implemented within a programmable IC. The circuit design specified by bitstream 115 is one for which timing has been closed for a selected programmable IC. The selected programmable IC, also referred to as the "target IC" or the "target programmable IC," is rated at a first speed grade. The act of "closing timing" or the state in which timing is closed refers to the circuit design meeting or exceeding one or more timing requirements that have been established as design goals for the circuit design. For purposes of discussion, it can be assumed that the first speed grade is faster and more costly than a same IC that is rated at a second speed grade. More particularly, an IC rated at the second speed grade is slower than a same type of IC rated at the first speed grade.

In closing timing for the circuit design represented by bitstream 115, the circuit design tools operable within computer system 110 are overly conservative when performing timing analysis. The circuit design tools, for example, utilize timing information that is overly conservative. Use of overly conservative timing information by computer system 110 increases the likely hood timing can be closed for the circuit design represented by bitstream 115. This, in turn, increases the likelihood that the target programmable IC, when loaded with bitstream 115, will meet or exceed the timing requirements in practice.

One reason for the conservative nature of the circuit design tools implemented within computer system 110 is that the timing information relied upon is heavily abstracted as compared to the actual circuitry of the target IC. In one example, the timing information utilized by computer system 110 is a speed file. As an illustration of the level of abstraction found in a speed file, a speed file may specify a single delay value to be used for timing analysis for a lookup table (LUT). The LUT, however, is a complex circuit in and of itself and includes a plurality of internal components and internal signals. Each of these internal components and signals can be characterized in terms of timing, which further varies according to the particular configuration of the LUT within the user's circuit design and location of the LUT on the target IC. In further illustration, a speed file does not account for quantities such as propagation delay, parasitic loading effects on circuit structures that vary according to the actual circuit design, slew rate, etc.

Attempting to account for all of the actual complexity of the target IC within the circuit design tools for an end user can be disadvantageous for several reasons. For example, accounting for the underlying complexity of a target IC within a circuit design tool typically increases runtime of the tool beyond acceptable time limits rendering the tool virtually unusable. Another example is that performing a detailed analysis of the circuit design that accounts for the underlying complexity of the target IC may require the IC designer to divulge trade secrets and confidential details of the IC to end-users or customers. For these reasons, the circuit design tools utilized by end users rely upon abstracted timing data that is overly conservative.

Accordingly, as pictured in FIG. 1, the entity associated with computer system 110 sends a circuit design represented by bitstream 115 to computer system 105. Computer system 105 performs an up-binning process 120 using bitstream 115. Up-binning process 120, as noted, refers a process for determining whether bitstream 115 can operate on a same type of target IC, but one with a slower speed rating than used by the end-user when compiling to close timing. As part of up-binning process 120, the circuit design represented by bitstream 115 can be modified in order to close timing for the circuit design on the target IC rated with the slower speed grade.

FIG. 1 illustrates that the resulting circuit design, represented by bitstream 125, is sent back to the customer from computer system 105 to computer system 110. In one aspect, bitstream 125 is different from bitstream 115. Still, bitstream 125 is functionally equivalent to bitstream 115. Further, bitstream 125, per up-binning process 120, meets or exceeds the timing requirement(s) initially met by bitstream 115, albeit using the target IC rated with the slower, e.g., second, speed grade.

Figure 2:
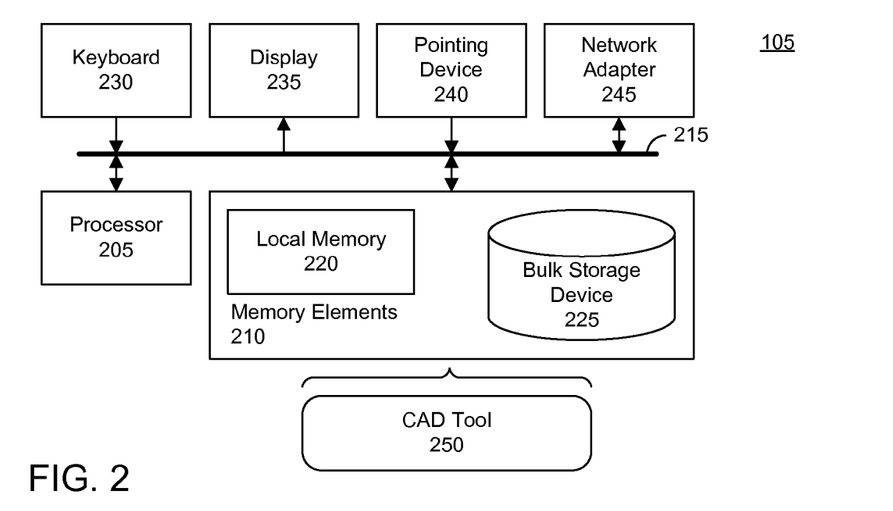
FIG. 2 is a block diagram illustrating an example of a computer system configured for up-binning a circuit design.

FIG. 2 is a block diagram illustrating an example of a computer system configured for up-binning a circuit design. More particularly, FIG. 2 is an exemplary implementation of computer system (system) 105 of FIG. 1.

System 105 includes at least one processor, e.g., a central processing unit (CPU), 205 coupled to memory elements 210 through a system bus 215 or other suitable circuitry. System 105 can store program code within memory elements 210. Processor 205 executes the program code accessed from memory elements 210 via system bus 215. As discussed, system 105 is a computer that is suitable for storing and/or executing program code. It should be appreciated, however, that system 105 can be implemented in the form of any system including a processor and memory that is capable of performing the functions described within this specification.

Memory elements 210 include one or more physical memory devices such as, for example, local memory 220 and one or more bulk storage devices 225. Local memory 220 refers to random access memory or other non-persistent memory device(s) generally used during actual execution of the program code. Bulk storage device(s) 225 can be implemented as a hard disk drive (HDD), solid state drive (SSD), or other persistent data storage device. System 105 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to system 105. The I/O devices can be coupled to system 105 either directly or through intervening I/O controllers. A network adapter 245 also can be coupled to system 105 to enable system 105 to become coupled to other systems, computer systems, remote printers, and/or remote storage devices through intervening private or public networks. Modems, cable modems, Ethernet cards, and wireless transceivers are examples of different types of network adapter 245 that can be used with system 105.

As pictured in FIG. 2, memory elements 210 can store a CAD tool 250. CAD tool 250, being implemented in the form of executable program code, is executed by system 105. As such, CAD tool 250 is considered an integrated part of system 105. CAD tool 250, in general, operates upon a received circuit design to perform an up-binning process. CAD tool 250 and any data items upon which CAD tool 250 operates, including circuit designs regardless of programmatic form, are functional data structures that impart functionality when employed as part of system 105 or, in some cases, when loaded into an IC such as a programmable IC.

Figure 3:
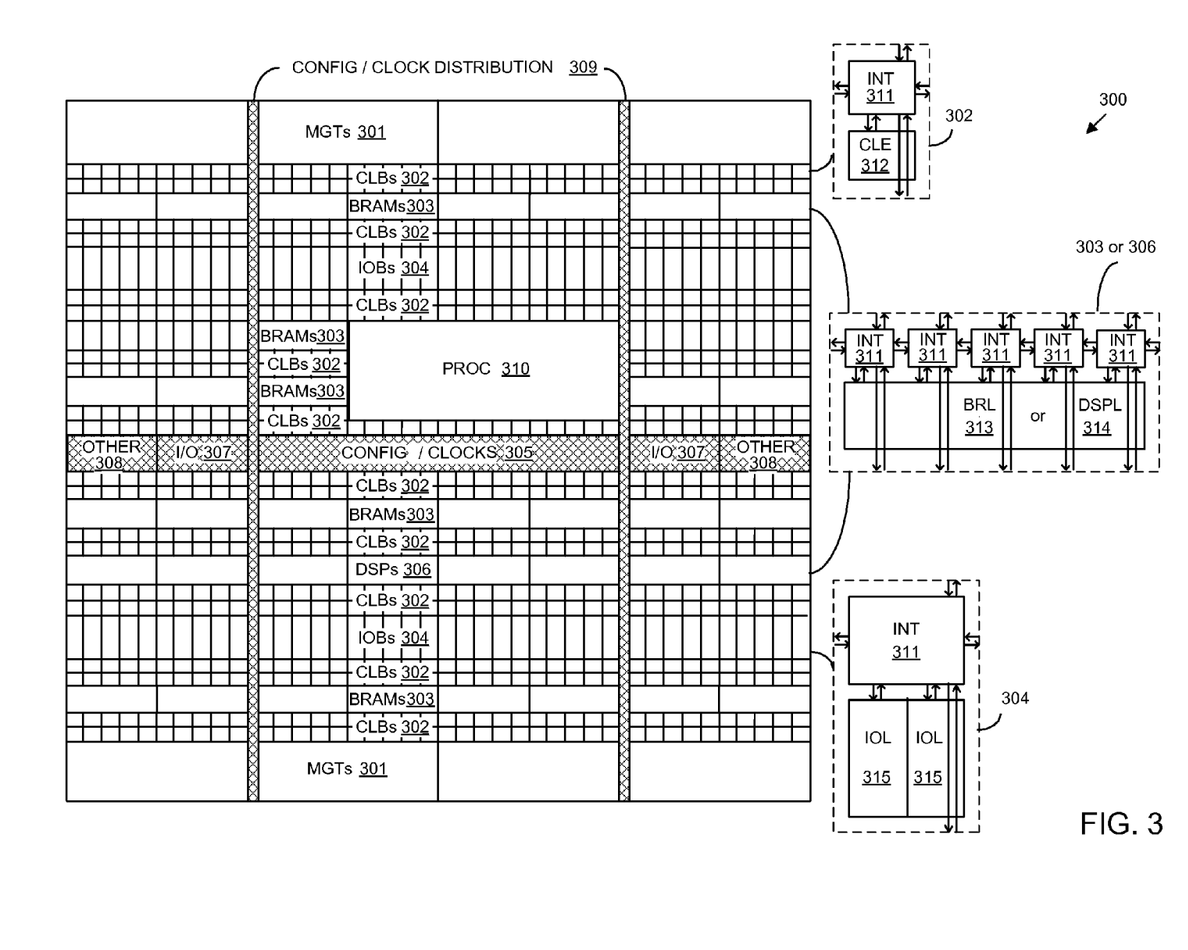
FIG. 3 is a block diagram illustrating an exemplary architecture for an integrated circuit.

FIG. 3 is a block diagram illustrating an exemplary architecture 300 for an IC. In one aspect, architecture 300 is implemented within a programmable IC such as, for example, a field programmable gate array (FPGA) type of IC. As shown, architecture 300 includes several different types of programmable circuit blocks. For example, architecture 300 can include a large number of different programmable tiles including multi-gigabit transceivers (MGTs) 301, configurable logic blocks (CLBs) 302, random access memory blocks (BRAMs) 303, input/output blocks (IOBs) 304, configuration and clocking logic (CONFIG/CLOCKS) 305, digital signal processing blocks (DSPs) 306, specialized I/O blocks 307 (e.g., configuration ports and clock ports), and other programmable logic 308 such as digital clock managers, analog-to-digital converters, system monitoring logic, and so forth.

In some ICs, each programmable tile includes a programmable interconnect element (INT) 311 having standardized connections to and from a corresponding INT 311 in each adjacent tile. Therefore, the INTs 311, taken together, implement the programmable interconnect structure for the illustrated IC. Each INT 311 also includes the connections to and from the programmable logic element within the same tile, as shown by the examples included at the top of FIG. 3.

For example, a CLB 302 can include a configurable logic element (CLE) 312 that can be programmed to implement user logic plus a single INT 311. A BRAM 303 can include a BRAM logic element (BRL) 313 in addition to one or more INTs 311. Typically, the number of INTs 311 included in a tile depends on the height of the tile. In the pictured example, a BRAM tile has the same height as five CLBs, but other numbers (e.g., four) can also be used. A DSP tile 306 can include a DSP logic element (DSPL) 314 in addition to an appropriate number of INTs 311. An IOB 304 can include, for example, two instances of an I/O logic element (IOL) 315 in addition to one instance of an INT 311. As will be clear to those of skill in the art, the actual I/O pads connected, for example, to IOL 315 typically are not confined to the area of IOL 315.

In the example pictured in FIG. 3, a columnar area near the center of the die, e.g., formed of regions 305, 307, and 308, can be used for configuration, clock, and other control logic. Horizontal areas 309 extending from this column are used to distribute the clocks and configuration signals across the breadth of the programmable IC.

Some ICs utilizing the architecture illustrated in FIG. 3 include additional logic blocks that disrupt the regular columnar structure making up a large part of the IC. The additional logic blocks can be programmable blocks and/or dedicated circuitry. For example, a processor block depicted as PROC 310 spans several columns of CLBs and BRAMs.

In one aspect, PROC 310 is implemented as a dedicated circuitry, e.g., as a hard-wired processor, that is fabricated as part of the die that implements the programmable circuitry of the IC pictured in FIG. 3. PROC 310 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 310 is omitted from architecture 300 and replaced with one or more of the other varieties of the programmable blocks described. Further, such blocks can be configured using appropriate configuration data such as a bitstream to implement a "soft processor" formed of the various blocks of programmable circuitry. The resulting soft processor can execute program code as is the case with PROC 310.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 3 such as CLBs 303 and BRAMs 303 can be considered programmable circuitry of the IC.

In general, the functionality of programmable circuitry is not established until configuration data is loaded into the IC. A set of configuration bits can be used to program programmable circuitry of an IC such as an FPGA. The configuration bit(s) typically are referred to as a "configuration bitstream" or "bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC. PROC 310 is an example of a hardwired circuit block.

In some instances, hardwired circuitry can have one or more operational modes that can be set or selected according to register settings or values stored in one or more memory elements within the IC. The operational modes can be set, for example, through the loading of a configuration bitstream into the IC or in real time during operation of the IC. Despite this ability, hardwired circuitry is not considered programmable circuitry as the hardwired circuitry is operable and has a particular function when manufactured as part of the IC.

FIG. 3 is intended to illustrate an exemplary architecture that can be used to implement an IC that includes programmable circuitry, which is sometimes referred to as a "programmable fabric." For example, the number of logic blocks in a column, the relative width of the columns, the number and order of columns, the types of logic blocks included in the columns, the relative sizes of the logic blocks, and the interconnect/logic implementations included at the top of FIG. 3 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of blocks such as PROC 310 within the IC are for purposes of illustration only and are not intended as a limitation of the examples disclosed within this specification.

When ICs are manufactured, each is typically characterized with a speed grade through testing. ICs rated with faster speed grades are more valuable than ICs rated with a slower speed grade. Such is the case since a given IC manufacturing process yields more ICs that are ultimately rated with slower speed grades than ICs rated with faster speed grades. Thus, two identical ICs, e.g., having an architecture as described with reference to FIG. 3, can be rated at different speed grades.

Figure 4:
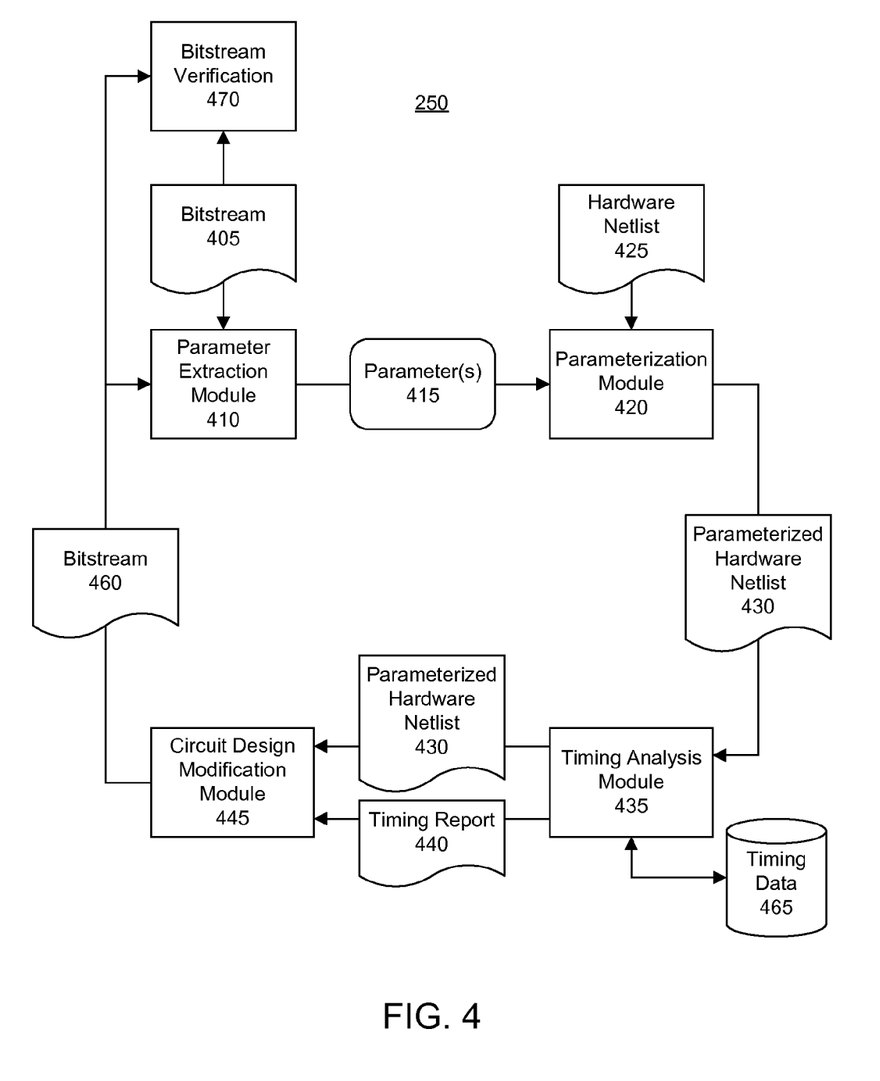
FIG. 4 is a block diagram illustrating an example of the CAD tool generally described with reference to FIG. 2.

FIG. 4 is a block diagram illustrating an exemplary implementation of CAD tool 250 of FIG. 2. It should be appreciated that CAD tool 250 can be implemented as a single monolithic application, as a collection of two or more applications that work cooperatively with one another, or the like. FIG. 4 illustrates processing performed by CAD tool 250, as executed by computing system 105, for up-binning a circuit design. As such, FIG. 4 is described in a state where a bitstream, e.g., a customer supplied bitstream, denoted as bitstream 405, has been received for processing.

For purposes of illustration, timing for bitstream 405 has been closed using end-user circuit development tools for a target programmable IC rated at a first speed grade. The up-binning process illustrated in FIG. 4 is intended to determine whether bitstream 405 can function on a same type of target programmable IC rated at a slower speed grade, i.e., a second speed grade. If not, the up-binning process can modify the circuit design as may be required.

As pictured, bitstream 405 is provided to a parameter extraction module 410. Parameter extraction module 410 extracts one or more parameters from bitstream 405. In particular, parameter extraction module 405 determines the various configuration settings for circuit blocks of the target programmable IC, connectivity among the circuit blocks of the target programmable IC, and the like that are specified by bitstream 405. The resulting parameter(s) 415 that are extracted are provided to a parameterization module 420.

Parameterization module 420 receives both parameters 415 and a hardware (HW) netlist 425. HW netlist 425 is a netlist of the target programmable IC that is to be configured using bitstream 405. HW netlist 425 represents the target programmable IC in an un-configured state where no bitstream is loaded. For example, HW netlist 425 specifies circuitry implementing an architecture as described with reference to FIG. 3 prior to the loading of a bitstream to implement a user-specified circuit design within the target programmable IC.

In one example, HW netlist 425 is a gate level netlist. In another example, HW netlist 425 is a Verilog description or a schematic description of the target programmable IC. It should be appreciated that HW netlist 425 can be specified in any of a variety of different programmatic forms. Unlike the abstract representations of the target programmable IC typically utilized in end-user circuit design tools, HW netlist 425 is specified without such abstractions. Referring to the prior example of a LUT, whereas an end-user circuit design tool utilizes a characterization of a LUT as a whole, e.g., an atomic unit, HW netlist 425 includes detailed information relating to the constituent components forming the LUT and the various signal paths included in the LUT.

Parameterization module 420 applies parameters 415 to HW netlist 425 resulting in a parameterized version of hardware netlist 425, which his referred to as parameterized HW netlist 430. Thus, whereas HW netlist 425 defines the target programmable IC in detail, but in an un-configured state, parameterized HW netlist 430 defines the target programmable IC in detail in a state where the target programmable IC has been configured to implement the circuit design specified by bitstream 405. More particularly, parameterized HW netlist 430 represents the target programmable IC after bitstream 405 has been loaded therein.

Parameterized HW netlist 430 is provided to timing analysis module 435. Timing analysis module 435 performs a detailed timing analysis upon parameterized HW netlist 430.

As shown, in performing timing analysis, timing analysis module 435 relies upon, or uses, timing data 465. Timing data 465 includes information and circuit characterization data for the target programmable IC that is much less abstract and, as such, more detailed, than the timing data utilized by end-user circuit design tools, e.g., a speed file.

Timing data 465 includes more detailed data that characterizes the target programmable IC using quantities such as crosstalk delay, IR (i.e., current-resistance or voltage) drop penalty, statistical variation, long path vs. short path timing adjustments, and the like for constituent components and signal paths within various programmable circuit blocks and elements within programmable circuit blocks of the target IC. Timing data 465 further includes real slew propagation data and silicon characterization data. In one example, timing data 465 includes "K-Sigma Foundry Models" for the target IC.

Timing analysis module 435 conducts a timing analysis on parameterized HW netlist 430 as opposed to performing timing analysis on a software model database as is the case with end-user circuit design tools. Timing analysis using software models is pessimistic by nature because of the level of abstraction present in the models to promote easier customer usage. Performing timing analysis using parameterized HW netlist 430 as described for a customer design removes the pessimism inherent in software models and allows more accurate timing optimizations of the sort available for application specific ICs (ASICs). Accordingly, CAD tool 250, using parameterized HW netlist 430, is able to achieve a more accurate and less conservative analysis of a user circuit design for purposes of up-binning. The timing analysis performed by timing analysis module 435 completely removes the in-built pessimism of speed files and software modeling limitations. Timing analysis module 435 performs timing analysis upon parameterized HW netlist 430 using appropriate timing data, e.g., silicon models, for a same type of target programmable IC, but one rated at a slower speed grade. The circuit design, however, must still meet the same timing requirements initially met by the circuit design specified by bitstream 405 when evaluated for implementation within the faster target programmable IC.

Timing analysis module 435 provides parameterized HW netlist 430 and timing report 440 to circuit design modification module 445. Timing report 440 also can be referred to as a "HW timing model" for parameterized netlist 430. Timing report 440 is, or includes, the results of the timing analysis performed by timing analysis module 435. Accordingly, timing report 440 indicates whether timing is closed for the circuit design, as represented by parameterized HW netlist 430, for a target programmable IC rated at a slower speed grade. When timing is not closed, the particular portions of parameterized HW netlist 430 can be identified within timing report 440.

When parameterized HW netlist 430 meets the timing requirement(s) previously met by bitstream 405, but for a target programmable IC of the same type rated at a slower speed grade, no modification of the circuit design is necessary. If timing is not closed, however, circuit design modification module 445 can modify parameterized HW netlist 430. As shown, in one exemplary implementation, an iterative loop can be created between circuit design module 445 and timing analysis module 435.

In one aspect, circuit design modification module 445 converts the HW timing model to a software timing model. In doing so, circuit design modification module 445 further generates a software model of parameterized HW netlist 430 to which the software timing model is applied. Parameterized HW netlist 430 includes a detailed description of hardware that is not required for the purpose of configuring a customizable gate array. Transformation of the HW timing model to a software timing model allows the circuit design modification module 445 operate directly upon the software timing model and the software model. A software timing model is a separate and distinct format and entity than the HW timing model. A software timing model specifies timing information for the various components that exist in the software model, which is distinct and separate from parameterized HW netlist 430 (e.g., a HW model).

As noted, the software model is generated, or determined from a HW model, e.g., parameterized HW netlist 430. A HW timing model, by comparison, includes timing information related to components specified in a HW netlist. It should be appreciated that the components in a software model do not correlate to components in a HW model on a one-to-one basis. Further, components in a software model can be specified in more abstract terms than components in a HW model. Using the software timing model, circuit design modification module 445 optimizes the circuit design by operating on the software model. Circuit design modification module 445 optimizes the circuit design to close timing for the target programmable IC rated at the slower speed grade. Circuit design modification module 445 generates a bitstream 460 from the optimized circuit design.

Bitstream 460 and bitstream 405 are provided to a bitstream verification module 470. Bitstream verification module 470 compares bitstream 460 with bitstream 405 to determine, and ensure, that the two bitstreams are functionally equivalent. In order to verify that two bitstreams have the same functionality, the HW netlist is configured using each of the two bitstreams separately. Accordingly, two representative circuits are created, i.e., one for each bitstream. Each of the two circuits is optimized to remove any redundant logic and/or circuitry not required for the purpose of verification. The two circuits are then verified using formal testing and/or verification tools to ensure equivalence. Upon verification that bitstream 460 is a functional equivalent of bitstream 405, a modified circuit design has been generated with closed timing for a target programmable IC rated at a slower speed grade than the target programmable IC used for purposes of closing timing on the original circuit design specified by bitstream 405.

FIG. 4 is an exemplary illustration of the operation of CAD tool 250. It should be appreciated, however, that while CAD tool 250 is illustrated as a single monolithic application formed of a plurality of modules, CAD tool 250 can be implemented as a collection of two or more interoperable applications, scripts, and the like. FIG. 4 is intended as an exemplary illustration of the processing techniques that are applied in up-binning a circuit design and is not intended as a limitation.

Figure 5:
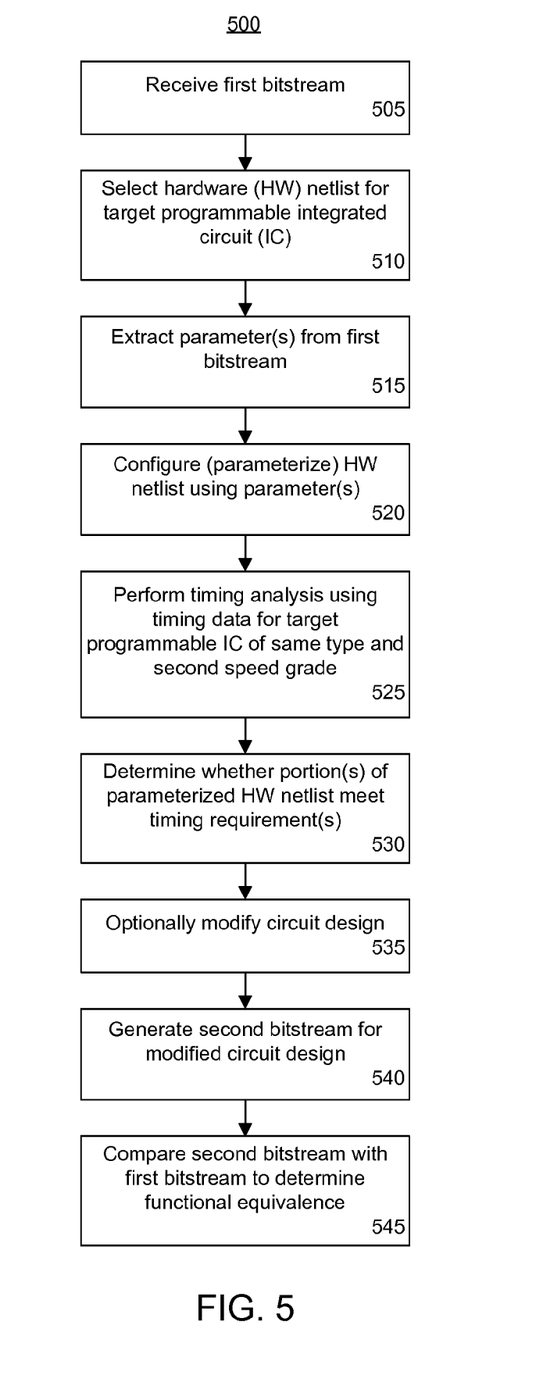
FIG. 5 is a flow chart illustrating an example of a method of up-binning a circuit design.

FIG. 5 is a flow chart illustrating an exemplary method 500 of up-binning a circuit design. Method 500 can be performed by a system such as system 105 as described with reference to FIGS. 1, 2, and 4 of this specification. Method 500 begins in a state where a customer has closed timing for a circuit design represented by a first bitstream and sent, or otherwise provided, the first bitstream for up-binning.

In block 505, the system receives a first bitstream from a user and/or customer. The first bitstream represents a circuit design for which timing has been closed for a target programmable IC rated at a first speed grade. In block 510, the system selects a HW netlist for the particular target programmable IC in which the first bitstream is to be loaded and used. In block 515, the system extracts, e.g., determines, one or more parameters from the first bitstream received in block 505.

In block 520, the system configures the HW netlist with the parameter(s) extracted in block 515. As noted, prior to configuration, the HW netlist represents the target programmable IC in an un-configured state, i.e., where no bitstream is loaded into the target programmable IC. The system configures the HW netlist by applying the parameters extracted in block 515 to the HW netlist thereby creating a parameterized HW netlist. The parameterized HW netlist represents the target programmable IC after the first bitstream has been loaded.

In block 525, the system performs timing analysis upon the parameterized HW netlist. The timing analysis that is performed utilizes more detailed timing information as previously described. For example, the timing information can include silicon characterization data, e.g., K-Sigma Foundry Models, for a same target programmable IC rated at a second speed grade. As noted, the second speed grade is slower than the first speed grade.

In block 530, the system determines whether one or more portions of the parameterized HW netlist meet the timing requirements for the circuit design using the timing information corresponding to the target programmable IC rated at the second speed grade. In one example, the system outputs a list of the most critical portions of the circuit design from the timing analysis. In one aspect, the most critical portions of the circuit design include those that do not meet the timing requirement(s). In another aspect, the most critical portions of the circuit design include those that meet the timing requirements, but by an amount less than a threshold amount or margin of safety.

In block 535, the system optionally modifies the circuit design. The system modifies the circuit design in the event that one or more portions do not meet the timing requirements when using the timing data for the target programmable IC rated at the second speed grade. In one example, the system converts the HW timing model to a software timing model. Further, the system generates a software model of the circuit design from the parameterized HW netlist. Optimization, e.g., modification, of the circuit design is performed using the software timing model in combination with the software model. For example, processes such as placement, routing, synthesis, or the like can be run or rerun upon one or more portions of the circuit design using the software model and the software timing model.

In block 540, the system generates a second bitstream for the modified circuit design. The second bitstream is generated from the software model. In block 545, the system compares the second bitstream with the first bitstream. The system performs a comparison to ensure that the second bitstream is functionally equivalent to the first bitstream. In the event the second bitstream is not functionally equivalent, an error message can be generated and output. Method 500 can repeat as necessary with the second bitstream being fed back to the system for processing in block 505 as the "first" received bitstream to repeat the processing if required.

The inventive arrangements disclosed within this specification describe methods, systems, and apparatus for up-binning a circuit design. The resulting circuit design can be implemented within a target programmable IC rated at a slower speed grade than used to originally close timing for the circuit design. The resulting circuit design, however, meets the same timing requirements originally established and met for the faster speed grade target programmable IC.

For purposes of explanation, specific nomenclature is set forth to provide a thorough understanding of the various inventive concepts disclosed herein. The terminology used herein, however, is for the purpose of describing particular examples only and is not intended to be limiting.

For example, the terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The terms "signal," "wire," and the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects disclosed within this specification can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a data storage medium, i.e., a non-transitory computer-usable or computer-readable storage medium, storing program code that, when loaded and executed in a system including a processor, causes the system to initiate and/or perform at least a portion of the functions and/or operations described within this specification. Examples of non-transitory data storage media can include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of exemplary implementations of systems, methods and computer program products. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Throughout this specification, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

One or more examples disclosed within this specification can be embodied in other forms without departing from the spirit or essential attributes thereof. Accordingly, reference should be made to the following claims, rather than to the foregoing specification, as indicating the scope of the invention.

What is claimed is:

1. A method, comprising:
    receiving a first bitstream specifying a circuit design;
    wherein the circuit design meets a timing requirement for a first speed grade of a programmable integrated circuit;
    determining, using a processor, a first parameter of the first bitstream;
    applying the first parameter to a hardware netlist of the programmable integrated circuit resulting in a parameterized hardware netlist specifying the circuit design;
    performing a timing analysis upon the parameterized hardware netlist; and
    determining, from the timing analysis, whether at least a portion of the parameterized hardware netlist meets the timing requirement when using timing data for a second speed grade of the programmable integrated circuit;
    wherein the second speed grade is slower than the first speed grade.

2. The method of claim 1, wherein the timing data for the second speed grade of the programmable integrated circuit comprises silicon characterization data.

3. The method of claim 1, further comprising:
    modifying the circuit design to meet the timing requirement using the timing data specific to the circuit design for the second speed grade of the programmable integrated circuit.

4. The method of claim 3, wherein modifying the circuit design comprises:
    generating a software model of the circuit design from the parameterized hardware netlist; and
    generating a software timing model from timing data generated from the timing analysis of the parameterized hardware netlist.

5. The method of claim 4, further comprising:
    generating a second bitstream from the software model.

6. The method of claim 5, wherein the second bitstream is functionally equivalent to the first bitstream.

7. The method of claim 5, further comprising:
    extracting a second parameter from the second bitstream;
    applying the second parameter to the hardware netlist of the programmable integrated circuit resulting in a second parameterized hardware netlist specifying the circuit design; and
    determining whether at least a portion of the second parameterized hardware netlist meets the timing requirement when using the timing data specific to the circuit design for a second programmable integrated circuit of a same type as the first programmable integrated circuit.

8. The method of claim 5, further comprising:
    comparing the first bitstream with the second bitstream; and
    indicating whether the second bitstream is functionally equivalent to the first bitstream.

9. A system, comprising:
    a processor programmed to initiate executable operations comprising:
        receiving a first bitstream specifying a circuit design;
        wherein the circuit design meets a timing requirement for a first speed grade of a programmable integrated circuit;
        determining a first parameter of the first bitstream;
        applying the first parameter to a hardware netlist of the programmable integrated circuit resulting in a parameterized hardware netlist specifying the circuit design;
        performing a timing analysis upon the parameterized hardware netlist; and
        determining, from the timing analysis, whether at least a portion of the parameterized hardware netlist meets the timing requirement when using timing data for a second speed grade of the programmable integrated circuit;
        wherein the second speed grade is slower than the first speed grade.

10. The system of claim 9, wherein the timing data for the second speed grade of the programmable integrated circuit comprises silicon characterization data.

11. The system of claim 9, wherein the processor is further programmed to initiate an executable operation comprising:
    modifying the circuit design to meet the timing requirement using the timing data specific to the circuit design for the second speed grade of the programmable integrated circuit.

12. The system of claim 11, wherein modifying the circuit design comprises:

generating a software model of the circuit design from the parameterized hardware netlist; and generating a software timing model from timing data generated from the timing analysis of the parameterized hardware netlist.

13. The system of claim 11, wherein the processor is further programmed to initiate an executable operation comprising:

generating a second bitstream from the software model.

14. The system of claim 13, wherein the second bitstream is functionally equivalent to the first bitstream.

15. The system of claim 14, wherein the processor is further programmed to initiate executable operations comprising:

extracting a second parameter from the second bitstream;

applying the second parameter to the hardware netlist of the programmable integrated circuit resulting in a second parameterized hardware netlist specifying the circuit design; and determining whether at least a portion of the second parameterized hardware netlist meets the timing requirement when using the timing data specific to the circuit design for a second programmable integrated circuit of a same type as the first programmable integrated circuit.

16. The system of claim 13, wherein the processor is further programmed to initiate executable operations comprising:

comparing the first bitstream with the second bitstream; and indicating whether the second bitstream is functionally equivalent to the first bitstream.

17. A non-transitory computer-readable medium having instructions stored thereon that, when executed by a processor, cause the processor to perform a method comprising:

receiving a first bitstream specifying a circuit design;

wherein the circuit design meets a timing requirement for a first speed grade of a programmable integrated circuit;

determining, using a processor, a first parameter of the first bitstream;

applying the first parameter to a hardware netlist of the programmable integrated circuit resulting in a parameterized hardware netlist specifying the circuit design;

performing a timing analysis upon the parameterized hardware netlist; and determining, from the timing analysis, whether at least a portion of the parameterized hardware netlist meets the timing requirement when using timing data for a second speed grade of the programmable integrated circuit;

wherein the second speed grade is slower than the first speed grade.

18. The non-transitory computer-readable medium of claim 17, wherein the timing data for the second speed grade of the programmable integrated circuit comprises silicon characterization data.

19. The non-transitory computer-readable medium of claim 17, wherein the method further comprises:

modifying the circuit design to meet the timing requirement using the timing data specific to the circuit design for the second speed grade of the programmable integrated circuit by generating a software model from the parameterized hardware netlist and a software timing model from timing data generated from the timing analysis of the parameterized hardware netlist.

20. The non-transitory computer-readable medium of claim 19, wherein the method further comprises:

generating a second bitstream from the software model;

wherein the second bitstream is functionally equivalent to the first bitstream.

* * * * *